United States Patent Office 3,287,274
Patented Nov. 22, 1966

3,287,274
HYDRAULIC BRAKE FLUID BASE
Gayle D. Edwards and Clifford L. Lambert, Jr., Austin, Tex., assignors to Jefferson Chemical Company, Inc., Houston, Tex., a corporation of Delaware
No Drawing. Filed May 27, 1963, Ser. No. 283,622
9 Claims. (Cl. 252—73)

This invention relates to the preparation of hydraulic brake fluid bases from which can be prepared brake fluids with high reflux boiling points, desirable low temperature properties, and minimum effect on rubber. More particularly, this invention relates to the novel glycol ether compositions employed in these brake fluid bases.

It is well known that brake fluid bases usually comprise three major components—a solvent, a rubber swell inhibitor, and a lubricant. Formulated brake fluids are prepared from these bases by the addition of minor amounts of various additives, such as, for example, oxidation inhibitors and corrosion inhibitors. The particular solvent, rubber swell inhibitor, and lubricant employed and the relative proportions of each are carefully chosen to prepare a brake fluid meeting particular specifications.

The solvent, which comprises 55 to 75 wt. percent of the brake fluid base, may be a higher aliphatic alcohol or, more commonly, a glycol ether. Since the solvent constitutes such a large percentage of the base, it must be carefully chosen to permit the preparation of formulated brake fluids having certain specific properties. For example, to prepare a brake fluid having a reflux boiling point of about 300° F., ethylene glycol monobutyl ether can be employed as the solvent, whereas to obtain a brake fluid having a reflux boiling point of around 400° F. ethylene glycol monobutyl ether is not suitable, but diethylene glycol monoethyl ether can be employed as the solvent.

It has now been discovered that the novel product obtained from the reaction of methanol with first ethylene oxide followed by propylene oxide can be utilized in the preparation of brake fluid solvents having widely varying properties. The product obtained from the reaction is distilled into two main fractions which can be recombined in any desired proportions to give the desired properties.

It is well known to react ethylene oxide with an alcohol in the presence of either acidic or basic catalysts, with the latter being preferred. This reaction may be conveniently conducted at temperatures of 80 to 160° C. and pressures of up to 200 p.s.i.g. After the reaction of the ethylene oxide is complete, propylene oxide may be introduced into the reactor and will react under the same conditions. The catalyst is neutralized and the salts so formed are removed by filtration prior to the distillation of the product. Many examples of alkoxylation catalysts are well known to those skilled in the art, and include, for example, boron trifluoride, alkali metals, alkali metal hydroxides, etc. The preferred catalysts for the instant invention are sodium hydroxide and potassium hydroxide. These catalysts may be neutralized with any suitable acid, such as, for example, acetic acid, phosphoric acid, oxalic acid, etc.

We have discovered that the best results are obtained if the molar ratio of ethylene oxide to methanol is maintained at between about 1:1 and 1.6:1 while that of the propylene oxide to methanol is maintained at from about 0.9:1 to about 1.4:1. It is preferred that the molar ratio of ethylene oxide and propylene oxide together to methanol be maintained at between about 2.3:1 and 2.5:1. However, molar ratios ranging from about 1.9:1 to about 3:1 may be employed. The sequence in which the oxides are reacted is important and the ethylene oxide should be reacted first.

It is to be understood that the product from this reaction will be a complex mixture comprising a large number of compounds having varying amounts of ethylene and propylene oxides reacted with methanol. Likewise, the two product fractions obtained by the distillation of this product will comprise complex mixtures.

After neutralization of the catalyst and filtration of the mixture, the product is distilled through a suitable column. Sufficient low boilers are taken overhead as a forecut (hereinafter designated as Fraction A) to leave a first residue having a reflux boiling point of about 420° F. Fraction A will generally constitute from about 15 to about 22 wt. percent of the product. This first residue is then flash distilled to remove haze-forming material, leaving a minimum amount of a second residue (about 4 to 10 wt. percent based on the first residue fraction). This second distillate is designated as Fraction B. We have found that if the first residue is used without further distillation, a haze will form in the brake fluid base on standing. The second distillation must be controlled so as to recover as much of the product as possible while leaving all the haze-forming material in the second residue. It is within the scope of this invention to obtain a Fraction B having a higher or lower reflux boiling point by taking more or less of the product overhead in the first distillation.

The amounts of Fractions A and B employed in preparing the blend will vary greatly, depending upon the final properties desired. In general, the amount of Fraction A employed will vary from about 0 to about 60 wt. percent while the amount of Fraction B will vary from about 100 to about 40 wt. percent. These percentages assume that the distillation is conducted in such a way as to provide a Fraction B having a reflux boiling point of about 420° F. If the reflux boiling point of Fraction B is different from 420° F., the amounts of Fractions A and B employed may differ from the amounts shown hereinabove.

The preparation of the novel glycol ether of the present invention will be further illustrated by the following example:

EXAMPLE I

A 10-gallon autoclave reactor equipped for stirring, heating or cooling, and introduction of oxides was purged of air and blanketed with nitrogen free of oxygen. Methanol (16.00 lbs.) and anhydrous potassium hydroxide (0.08 lb.) were placed in the reactor and the mixture was heated to 100 to 105° C. Ethylene oxide was then added at a rate such that the temperature of the reaction could be maintained between 115 to 120° C. and at a maximum autoclave pressure of 80 p.s.i.g. Following the addition of 22.00 lbs. of ethylene oxide and a short period of digestion (about 1 hour), 40.00 lbs. of propylene oxide was added at 120 to 125° C. and 80 p.s.i.g. After the addition of the propylene oxide was complete, the temperature was raised to 145° C. and the reaction mixture held at this temperature for 2 to 4 hours. The mixture was then cooled to 80° C. and the catalyst was neutralized with 0.09 lb. of oxalic acid. The product was then filtered and distilled as described hereinabove.

By proper formulation of Fractions A and B with rubber swell inhibitors and lubricants, there are obtained brake fluid bases from which can be made brake fluids meeting various specifications, such as, for example, SAE 70R1 and SAE 70R3 brake fluid specifications. It is an advantage of this invention that these various specifications can be met by the use of what is essentially only one solvent component. The need to prepare two or more widely differing solvent components is eliminated.

In addition to the above-described versatility, the mixed ethylene oxide-propylene oxide adduct of the present invention offers the additional advantages of a lower freezing point than can be obtained when ethylene oxide alone is used and better low temperature characteristics than can be obtained from the use of propylene oxide alone. Further, the hydraulic brake fluids prepared from the novel glycol ether of the present invention do not greatly affect rubber.

As stated hereinabove, brake fluid bases normally contain three major components. The solvent is the major component and may comprise 55 to 75 wt. percent of the base. The amount of rubber swell inhibitor used will normally depend upon the protection needed but generally ranges from 8 to 22 wt. percent. The lubricant will normally comprise from 15 to 25 wt. percent of the brake fluid base. The formulated brake fluid is obtained by adding minor components, such as, for example, oxidation inhibitors and corrosion inhibitors to the base.

The solvent component of the instant invention may be employed with a wide variety of rubber swell inhibitors and lubricants in the preparation of a brake fluid base. Examples of rubber swell inhibitors and lubricants are well known to those skilled in the art. Commonly used rubber swell inhibitors include propylene glycol, dipropylene glycol, ethylene glycol, diethylene glycol and hexylene glycol, while lubricants that are normally employed include natural products, such as, for example, castor oil and alkylene oxide adducts thereof a swell as synthetic lubricants, generally polyoxyalkylene ethers. Specific examples of synthetic lubricants include polypropylene glycols of various molecular weights as well as propylene oxide adducts of polyhydric compounds, such as, for example, glycerine. In preparing these lubricants, ethylene oxide may be mixed with the propylene oxide in a heteric or blocked manner.

That brake fluid bases having widely different properties can indeed be obtained by following the teachings of this invention will be amply demonstrated by reference to Table I, wherein are disclosed the formulas for two bases employing the novel solvent system described hereinabove.

*Table I*

|  | R1 | R3 |
|---|---|---|
| Components, wt. percent: |  |  |
| Fraction A | 24 |  |
| Fraction B | 34 | 72 |
| Diethylene Glycol | 20 | 9 |
| Propylene Glycol |  | 2 |
| Polypropylene Glycol 400 | 10 | 5 |
| Polypropylene Glycol 2000 | 12 | 12 |
| Properties: |  |  |
| Reflux boiling point, ° F | 323 | 419 |
| Viscosity at −40° F. cs | 1,270 | 1,340 |
| Viscosity at 130° F., cs | 5.20 | 5.35 |
| Natural rubber swell, inches | 0.022 |  |
| GRS rubber swell, inches |  | 0.040 |

It can be seen from Table I that two fluid bases having widely different reflux boiling points were obtained by proper blending of Fractions A and B. The brake fluid base represented by Column R1 is suitable for the preparation of a formulated brake fluid meeting SAE 70R1 specifications, while the brake fluid base represented by Column R3 is suitable for preparing a formulated brake fluid meeting SAE 70R3 specifications.

It is readily apparent to one skilled in the art that brake fluid bases having different properties from those in Table I can be obtained by proper formulation. For example, the reflux boiling point of a fluid of type R1 can be raised by using less Fraction A and more Fraction B in the solvent. It is also readily apparent that substitutions in the formulations may be made. For example, hexylene glycol may be employed to replace portions of the propylene glycol and diethylene glycol used as rubber swell inhibitors. Further, a polypropylene glycol with a molecular weight intermediate to the molecular weights of the two polypropylene glycols shown, may be used rather than using a blend. Other lubricants such as, for example, castor oil or propylene oxide adducts of glycerine or mixed ethylene and propylene oxide adducts of glycerine may also be used.

Having thus described our invention, what is claimed is:

1. A method for preparing a brake fluid solvent which comprises
   (A) reacting
      (a) methanol in the presence of an alkoxylation catalyst with
      (b) from 1.0 to 1.6 mols of ethylene oxide followed by
      (c) from 0.9 to 1.4 mols of propylene oxide at a temperature of 80 to 160° C. and a pressure of up to 200 p.s.i.g.,
   (B) neutralizing the alkoxylation catalyst,
   (C) filtering the mixture so produced to remove insoluble salts,
   (D) distilling the filtrate to obtain an overhead product Fraction A comprising from about 15 to about 22 wt. percent of said filtrate and a first residue fraction having a reflux boiling point of about 420° F.,
   (E) further distilling said first residue fraction to obtain an overhead product Fraction B free of nonvolatile components and a second residue fraction comprising from about 4 to about 10 wt. percent of said first residue fraction, and
   (F) blending from 0 to about 60 wt. percent of said Fraction A with from 100 to about 40 wt. percent of said Fraction B to obtain thereby said brake fluid solvent.

2. A method as in claim 1 wherein the alkoxylation catalyst is selected from the group consisting of sodium hydroxide and potassium hydroxide and the neutralizing agent is selected from the group consisting of acetic acid, phosphoric acid and oxalic acid.

3. A method as in claim 2 wherein 1.0 to 1.1 mols of ethylene oxide and 1.3 to 1.4 mols of propylene oxide are employed.

4. A product prepared by the process of claim 1.

5. A brake fluid base comprising 55 to 75 wt. percent solvent, 8 to 22 wt. percent rubber swell inhibitor selected from the class consisting of propylene glycol, dipropylene glycol, ethylene glycol, diethylene glycol and hexylene glycol and 15 to 25 wt. percent lubricant selected from the class consisting of castor oil, and polyoxyalkylene ethers, wherein said solvent is obtained by
   (A) reacting methanol with 1.0 to 1.6 mols of ethylene oxide followed by 0.9 to 1.4 mols of propylene oxide in the presence of an alkoxylation catalyst at a temperature of 80 to 160° C. and a pressure of up to 200 p.s.i.g.,
   (B) neutralizing said alkoxylation catalyst,
   (C) filtering the mixture to remove insoluble salts,
   (D) distilling the filtrate to obtain an overhead product Fraction A comprising from about 15 to about 22 wt. percent of said filtrate and a first residue fraction having a reflux boiling point of about 420° F.,
   (E) further distilling said first residue fraction to obtain an overhead product Fraction B free of nonvolatile components and a second residue fraction comprising from about 4 to about 10 wt. percent of said first residue fraction, and
   (F) blending from 0 to about 60 wt. percent of said Fraction A with from 100 to about 40 wt. percent of said Fraction B to obtain thereby said solvent.

6. A brake fluid base as in claim 5 wherein said solvent comprises from 35 to 45 wt. percent Fraction A and 65 to 55 wt. percent Fraction B, said rubber swell inhibitor is selected from the group consisting of propylene glycol, diethylene glycol and mixtures thereof, and said lubricant is a polypropylene glycol.

7. A brake fluid base as in claim 6 comprising 55 to 65 wt. percent solvent, 15 to 22 wt. percent rubber swell inhibitor, and 18 to 25 wt. percent lubricant.

8. A brake fluid base as in claim 5 wherein said solvent comprises 100 wt. percent Fraction B, said rubber swell inhibitor is selected from the group consisting of propylene glycol, diethylene glycol and mixtures thereof, and said lubricant is a polypropylene glycol.

9. A brake fluid base as in claim 8 comprising 65 to 75 wt. percent solvent, 8 to 15 wt. percent rubber swell inhibitor, and 15 to 22 wt. percent lubricant.

References Cited by the Examiner

UNITED STATES PATENTS

| | | | |
|---|---|---|---|
| 2,499,551 | 3/1950 | White | 252—73 |
| 2,803,605 | 8/1957 | Doelling et al. | 252—73 X |
| 3,062,747 | 11/1962 | Fife et al. | 252—73 |

LEON D. ROSDOL, *Primary Examiner.*

JULIUS GREENWALD, *Examiner.*

R. D. LOVERING, *Assistant Examiner.*